United States Patent [19]

Beersel et al.

[11] Patent Number: 5,366,771
[45] Date of Patent: Nov. 22, 1994

[54] RECOVERABLE FABRIC SLEEVE

[75] Inventors: Jozef V. Beersel, Temse; Noel K. M. Overbergh, Rotselaar; Firmin Ross, Waarschoot, all of Belgium

[73] Assignee: NV Raychem SA, Belgium

[21] Appl. No.: 842,404

[22] PCT Filed: Sep. 25, 1990

[86] PCT No.: PCT/GB90/01472

§ 371 Date: Mar. 25, 1992

§ 102(e) Date: Mar. 25, 1992

[87] PCT Pub. No.: WO91/04844

PCT Pub. Date: Apr. 18, 1991

[30] Foreign Application Priority Data

Sep. 29, 1989 [GB] United Kingdom ............... 8921967

[51] Int. Cl.⁵ ............................................. B65B 53/00
[52] U.S. Cl. ................................. 428/34.9; 428/245; 428/36.1; 428/246; 428/251; 428/259
[58] Field of Search ...................... 428/34.9, 245

[56] References Cited

U.S. PATENT DOCUMENTS

| 2,027,962 | 1/1936 | Currie | 18/55 |
| 3,086,242 | 4/1963 | Cook et al. | 18/1 |
| 3,597,372 | 8/1971 | Cook | 260/4 |
| 3,945,493 | 3/1976 | Cardinal | 206/386 |
| 4,554,202 | 11/1985 | Kamei et al. | 428/225 |
| 4,877,660 | 10/1989 | Overbergh et al. | 428/34.9 |

FOREIGN PATENT DOCUMENTS

| 0116392 | 8/1984 | European Pat. Off. |
| 0116393 | 8/1984 | European Pat. Off. |
| 0117026 | 8/1984 | European Pat. Off. |
| 0278707 | 8/1988 | European Pat. Off. |

OTHER PUBLICATIONS

PCT/GB90/01472 International Search Report.

*Primary Examiner*—George F. Lesmes
*Assistant Examiner*—Chris Raimund
*Attorney, Agent, or Firm*—Marguerite E. Gerstner; Timothy H. P. Richardson; Herbert G. Burkard

[57] ABSTRACT

A heat recoverable wraparound fabric sleeve comprises 7-13 heat recoverable fibers in one direction and 4-8 fibers some of which are heat recoverable and some of which are heat stable in a perpendicular direction. This sleeve has particularly useful recovery behavior where recovery ratios are less than 40% and where an auxiliary patch is used to bond overlapping edges of the wraparound sleeve to each other.

15 Claims, 1 Drawing Sheet

RECOVERABLE FABRIC SLEEVE

BACKGROUND OF THE INVENTION

1. Field of the Invention

This invention relates to a wraparound, heat-recoverable fabric sleeve for enclosing an elongate object, such as a pipe or a cable, or joints or splices between pipes or cables. In particular the invention relates to such a wraparound sleeve, having longitudinal edges which overlap to close the wraparound.

2. Introduction to the Invention

Heat recoverable articles are well known. They are articles whose dimensional configuration may be made to change when subjected to an appropriate treatment. Typically heat recoverable articles comprise a heat shrinkable sleeve made from a polymeric material that exhibits the property of elastic or plastic memory as described, for example in U.S. Pat. Nos. 2,027,962, 3,086,242 and 3,597,372. More recently heat recoverable articles comprising fabrics have become known, as described for example in EP-A-0116393 (MP0790) and EP-A-0117026 (RK176) and EP-A-0116392 (RK178). These comprise a recoverable fabric in conjunction with a polymeric matrix formed by laminating a polymeric material to one or both sides of the fabric to render it impervious.

Wraparound heat-recoverable sleeves for enclosing elongate objects are also well known. They typically comprise a sheet of material which is wrapped around the object, and then the longitudinal edges held together in some way to close the wraparound to form a tubular article. In some known wraparound sleeves the longitudinal edges overlap. They may then be secured together by bonding e.g. by adhesive, by fusion or by a penetrating closure such as stitching or riveting. Where the longitudinal edges overlap in this way an additional patch closure strip may be used, bonded over the overlapped edges. Again the bond between the patch and each of the overlapped edges may be by adhesive, by fusion or by a penetrating closure means. The bond between the patch on each of the overlapped edges may be instead of, but is usually additional to, the bond between the overlapped edges themselves. Other types of closure are also known for wraparound sleeves. One common closure, known as a "rail and channel" closure, comprises forming the longitudinal edges of the sleeve into upstanding rails, and providing a channel which slides over the rails to hold the wraparound article closed. Typically the "rail and channel" closure and other similar mechanical-type closures can withstand significantly higher recovery forces than the overlapped and patch type closures: the latter being liable to pull out at the closure as a result of the shear forces between the lapped edges, or between the lapped edges and the patch, generated by the hoop stresses of recovery.

Known wraparound, heat recoverable fabric sleeves are described in EP-A-0116392 (RK178) and EP-A-0278707 (B137). The latter patent application describes a particular type of fabric design which is particularly applicable for heat recoverable articles having a recovery ratio of greater than 40% e.g. up to 75%, and which are advantageously closed by a rail and channel type closure that is able to withstand recovery forces up to 30N per 50 mm.

Summary of the Invention

We have now designed a new recoverable wraparound fabric sleeve that is particularly suitable for use for covering an object where recovery ratios less than 40% are required e.g. 20-30%, and where the edges of the closure are closed by overlapping, optionally with an auxiliary patch, where it is desirable to minimise the shear, hoop, and/or recovery forces at the closure.

The present invention provides a recoverable wraparound article having a recovery ratio of between 15-40%, and comprising (a) a fabric having 7 to 13 heat recoverable fibers per cm in one direction and 4 to 8 fibers, some of which are heat recoverable, and some of which are eat stable, in a substantially perpendicular direction, and (b) polymeric material laminated to at least one side of the fabric.

DETAILED DESCRIPTION OF THE INVENTION

Heat stable fibers are those which are not inherently dimensionally recoverable on heating.

The recovery ratio in the present invention is defined in terms of a percentage. The ratio represents the change in a dimension as a percentage or the same dimension before recovery. The recovery ratio of the article of the present invention is in the range of 15-40%. Preferably the recovery ratio is in the range 20-30%. The minimum ratio of 15% is sufficient to allow the article to be fitted over and shrunk to encapsulate a number of objects, in a variety of applications. It is not sufficient for sealing onto some of the objects described in EP-A-0278707 (B173), which have a large variation in diameter along their length, but these are not the subject of the present application. The maximum ratio is 40%, preferably 35%, more preferably 30%. A maximum is specified because we have found that for a wraparound article comprising a lap bond, if the recovery ratio is too high, the portion of the sleeve forming the underside of the lapped region becomes too thick on recovery, tending to weaken the bond in the closure region. Preferably the sleeve has a thickness after recovery which is at most 1.2-1.4 times its thickness before recovery. In absolute terms, the thickness before recovery is preferably about 1.8 mm, and the thickness after recovery is preferably about 2.4 mm.

The recoverable fabric is preferably provided by interlinking (preferably weaving) fibers that are already recoverable, rather than by deforming a fabric woven from dimensionally stable fabrics. In the preferred case, the recovery ratio of the article depends at least on the following features: (a) the recovery ratio and the recovery force of the fibers per se, (b) the number of recoverable fibers per unit length in the fabric, (c) the nature of the laminated polymeric material, in particular its viscosity, and (d) the fabric design. Thus the desired recovery ratio can be achieved by balancing features (a) to (d) above.

Features (a) to (d) discussed in the previous paragraph are also to be balanced to achieve the desired recovery force of the article of the present invention, which is preferably less than 25N per 25 mm, more preferably less then 15N per 25 mm. As described above where a wraparound is closed by a lap bond, on recovery hoop forces are generated at the closure region. These tend to shear the overlapping edges apart. Where a patch is used over the overlapped edges they tend to shear the patch from the sheet edges. Hence the desire to limit the maximum recovery force of the article.

A preferred method of making the fabric according to the invention comprises weaving the fibers into a fabric, laminating them on both sides with a polymeric material and cross-linking the article preferably by irradiating it with a beam of high energy electrons. The irradiation step cross-links both the recoverable fibers of the fabric and the matrix polymer. This increases the viscosity of the matrix, and increases the post recovery strength of the fibers.

The viscosity increase is preferably sufficiently high not only to prevent dripping or running during heat-recovery, particularly during heat recovery by means of a torch, but also sufficiently high to act against the recovery forces of the fibers to achieve a recovery ratio in the ratio 15-40%, and preferably also the desired recovery force. Thus the viscosity of the matrix acts in conjunction with the fibers to achieve the desired recovery ratio and force.

In the prior art reference EP-A-0278707 (B137) different extents of cross-linking are required by the fibers of the fabric and the polymer of the matrix, and accordingly a two-step process is preferred. In the present invention a simple one step beam is sufficient by appropriate selection of the density of the recoverable fibers.

Chemical peroxide cross-linking agents may be used in place of irradiation.

The article comprises a polymeric material laminated to at least one side of the fabric. The purpose of the polymeric material is to render the fabric substantially impervious The extent to which the fabric need be impervious depends on the use of the sleeve. For example, imperviousness to water, oil, fuel or hydraulic fluids may be required. A degree of perviousness will, in general, be tolerable depending on the nature of the substrate and on the length of time that the assembly will be in use.

The polymeric material is laminated to, and preferably extends throughout the recoverable fabric. We prefer that a true composite structure be formed between the recoverable fabric and a polymeric material by means of which it is rendered impervious. We prefer that the polymeric material provides a matrix material through which the fabric material be chemically and/or physically compatible with the polymeric material. By physically compatible we mean that the relevant properties of the two materials are similar or identical during lamination, recovery and use. Chemically similar materials are preferred, for example both recoverable fibers and matrix may be polyolefins, and preferred materials are high density and low density polyethylene respectively.

Other thermoplastic or elastomeric materials can be used. Examples of thermoplastic materials include: ethylene/vinyl acetate copolymers, ethylene/ethyl acrylate copolymers, LLDPE, LDPE, MDPE, HDPE, polypropylene, polybutylene, polyesters, polyamides, polyetheramides, perfluoroethylene/ethylene copolymers, and polyvinylidene fluoride. The following is a list of preferred elastomeric materials: ABS block copolymers, acrylics including acrylates, methacrylates and their copolymers, high vinyl acetate copolymers with ethylenes, polynorbornene, polyurethanes and silicone elastomers.

The sleeve of the invention thus preferably comprises a composite structure of a heat-recoverable fabric and polymer matrix material as defined in EP-A-0116393 (MP0790 EP) wherein:

(a) the heat recoverable fabric comprises fibers that will recover when heated, the fibers having a recovery stress Y of at least $1 \times 10^{-2}$, preferably at least $5 \times 10^{-2}$ more preferably at least 1 MPa at a temperature above their recovery temperature; and (b) the polymer matrix material has a elongation/temperature profile such that there exists a temperature (T) which is at or above the recovery temperature of the fibers at which temperature the polymeric matrix material has an elongation to break of greater than 20%, preferably greater than 100%, especially from 400-700% and a 20% secant modulus X or at least $10^{-2}$ MPa (measured at a strain rate of 300% per minute), and at which temperature the inequality is satisfied:

X (1-R), is less than one, preferably

Y R lass then 0.5, more preferably less than 0.05. wherein R is the mean effective volume fraction of heat-recoverable fibers in the composite structure along a given direction based on the total volume of the composite structure, or relevant portion thereof.

The precise technique by means of which the fabric is rendered substantially impervious will of course depend on whether, for example, the polymeric material is simply used in conjunction with the fabric, is adhered to a surface (preferably an inner surface) of the fabric, extends throughout the fabric, or is introduced in some other way. The extent of mechanical interaction required between the fabric and the polymeric material will depend on the extent of bonding that can be achieved during manufacture, and this is a function of the difference between the melt or softening temperature of the polymeric material and the recovery temperature of the fabric. Unless a further stretching operation is to be carried out later, recovery should not occur at this stage. Recovery could of course be avoided by mechanically holding the fabric, but this tends to make incorporation of the polymeric material rather complex. Suitable techniques for coating the fabric with a polymeric material which achieve at least some penetration include press lamination, hot coating the fabric with a polymeric material press lamination, hot coating from the melt between rollers, spray coating, dip coating and powder coating.

The amount of polymeric material used should be sufficient to render the fabric sleeve substantially impervious to air when it is recovered. It is possible, therefore, for the polymeric material to be a discontinuous coating or impregnation before recovery, and optionally to melt or soften sufficiently to be brought together on recovery to provide a substantially impervious barrier. We prefer, however, that the composite of fabric and polymeric material be substantially impervious before as well as after recovery. The thickness of the polymeric material should be great enough to counteract the recovery forces of the fabric to achieve the desired recovery ratio (also dependent on viscosity as described above), but small enough to allow the fabric to recover to the desired extent. The composite desirably recovers as a unit with no appreciable drawing-through of fabric within the matrix. A suitable thickness of polymeric material is 0.5-1.5 mm preferably about 1 mm on the inside of the fabric and about 0.5 mm on the outside of the fabric. Such a polymeric layer will generally soften during recovery but has a sufficiently high viscosity that it is retained by the fabric. A polymeric material initially having a sufficiently high viscosity may be used, or the viscosity of a low viscosity material may be increased by cross-linking, particularly by beaming.

Where two layers of polymeric material are provided one on each side of the sleeve, both layers may be cross-linked, for example by irradiation, or only the layer on the outer surface of the sleeve.

The preferred article according to the invention is recoverable predominantly in one direction. Thus for a heat shrinkable wraparound sleeve, the sleeve is recoverable predominantly along the direction corresponding to the circumference of the sleeve. However it has been found advantageous in the present invention to include non-recoverable fibers, and also a smaller number of heat-recoverable fibers in the substantially perpendicular direction. This finding is based on the observation that when the sleeve shrinks predominantly in one direction, the tightening of the shrinkable fibers in said one direction around the non-shrinkable fibers in the substantially perpendicular direction causes the end to end length of the non-shrinkable fibers to appear to increase. This is thought to be due to the shrinking fibers tightening onto, and reducing any undulations in the non-shrinkable fiber caused by their winding path, in and out of the shrinkable fibers. In a lap wraparound closure, this is disadvantageous since it results in wrinkling at the lap. This effect is particularly apparent where a heat stable patch is used at the lap since the increase in length of the sleeve is not matched by the patch, and their difference in lengths causes wrinkling at the patch edges. By incorporating a number of shrinkable fibers into the said substantially perpendicular direction the lengthening effect in that direction on recovery of the fibers in the said one direction is counter-balanced. Preferably the article comprises less than 0.5, preferably less than 0.25 times as many heat recoverable fibers in said perpendicular direction as in said one direction. Preferably the article comprises more, preferably about twice as many heat-stable, non recoverable fibers as recoverable fibers in said perpendicular direction.

The said one direction, i.e. the predominant recovery direction, may constitute either the warp or the weft of the fabric. In some applications, particularly where large diameter sleeves are required it preferably constitutes the warp, enabling it to be made on reasonably sized machines.

The preferred fabric used according to the invention is a weave. Other designs e.g. knits may be used.

Different effects, in terms of for example, final recovery ratio, strength and flexibility, will result from different types of weave even if the same fibers are used. Examples of type of weave include broken twill and twill, especially broken twill 2/2 (two up, two down) and twill 2/2 (two up, two down), satin 4, and satin 5 and related complex designs. Certain weaves are said to have a "float". A "float" is the number of fibers in one direction (say the weft) which a fiber in the other (say warp) direction passes over, before passing under again. The weave may be single ply, or if higher density or thicker fabrics are desired multiple ply weaves may be used.

According to the invention there are 7-13 recoverable fibers per cm in the said one direction (the predominant recovery direction), preferably about 10 per cm. Preferably the heat recoverable fibers are 0.3-0.5 mm in diameter, especially about 0.4 mm. Preferably the heat recoverable fibers have a rex (weight in g per cm) of 50 to 200. Each recoverable fiber may comprise, for example, a shrinkable polyethylene fiber.

The non-recoverable fibers in the substantially perpendicular direction preferably have a tex of 60–220. Each non recoverable "fiber" may comprise for example a bundle of glass fibers. Preferably there are 2-6 nonrecoverable fibers per cm in the substantially perpendicular direction preferably about 4 per cm. Preferably there are about half as many recoverable fibers as non-recoverable fibers in the substantially perpendicular direction, i.e. about 1-3 per cm, preferably about 2 per cm. Preferably the recoverable and the non-recoverable fibers are uniformly arranged. One particular arrangement is a repetition of two recoverable fibers-/one recoverable fiber etc. The two non-recoverable fibers may be two glass fiber bundles wrapped together.

The fibers used to produce the recoverable fabric may be monofilaments, multifilaments spun staple yarns or yarns produced by fibrillation, for example from film. Greater flexibility can be attained using multifilament yarns, although problems can be encountered in cross-linking due to the high surface area. Examples of polymeric materials that may be used as the recoverable fibers include polyolefins such as polyethylene (especially HDPE) and polypropylene, polyamides, polyesters and fluoropolymers such as FEP, ethylene perfluoro copolymers, polyvinylidine fluoride and TFE copolymers. The recovery temperature, by which we mean the temperature at which recovery will go substantially to completion, is preferably 60° C. or more, more preferably from 80°–250° C., most preferably from 100°–150° C.

The heat recoverable fibers may be provided individually, or in bundles.

Non-recoverable fibers are used together with the recoverable fibers. The following non-recoverable materials may be regarded as illustrative: glassfibers, carbon fibers, wires or other metal fibers, polyesters, aromatic polymers such as aromatic polyamides for example Kevlar (trade name), imides and ceramics. The non-recoverable component may be permanent, giving the recovered article enhanced strength etc., or may be present in discrete form only to locate the recoverable component during installation.

The polymeric embedded fabric sleeve is preferably coated with an adhesive on its inside, i.e. on that side which will face the substrate to be enclosed, although the polymeric material providing imperviousness may alone provide the desired adhesiveness under installation conditions. Heat-activatable adhesives are preferred, especially hotmelt adhesives such as polyamides and EVAs.

The invention is further illustrated by reference to the accompanying drawings, by way of example, in which.

Figure 1:
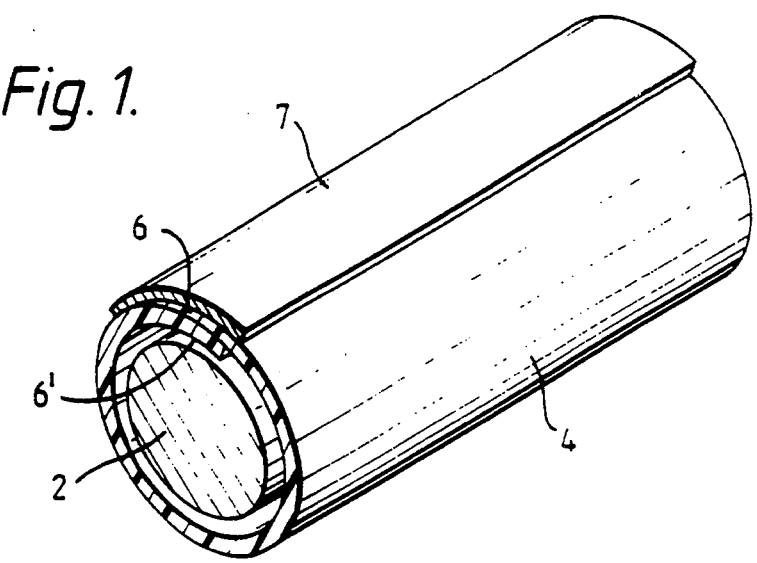
FIG. 1 is a perspective view showing a recoverable wraparound sleeve according to the invention, positioned around an object to be covered.

Referring to the drawings, FIG. 1 shows an object 2 surrounded by a heat shrinkable, wraparound cover 4, the longitudinal edges 6 of which overlap to form a tubular article. A heat stable patch 8 extends along the article overlying the overlapped longitudinal edges 6.

The heat shrinkable wraparound cover 4 comprises a fabric 8. The warp of the fabric comprises 10 heat-shrinkable high density polyethylene fibers per cm, each having a diameter of 0.4 mm. The weft of the fabric comprises 4 heat-stable glass fibers and 2 heat shrinkable polyethylene fibers (identical to those in the warp). The glass and polyethylene are arranged uniformly, in a pattern two glass, one polyethylene etc. The fabric is predominantly shrinkable in its warp direction. Hence the warp is arranged to extend around the circumference of the wrapped cover to provide a radially heat shrinkable cover.

Figure 2:
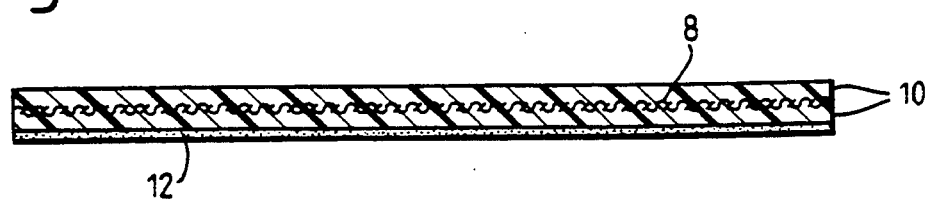
FIG. 2 is a cross-sectional view through the cover of FIG. 1.

As best seen in FIG. 2, the fabric 8 is embedded in a matrix of low density polyethylene 10 which is achieved by laminating the fabric on both sides. One surface of the embedded fabric is coated with a hot melt adhesive layer 12. This forms the inner surface of the wrapped cover.

The heat-shrinkable fabric cover is manufactured by weaving the recoverable fibers, laminating with low density polyethylene, cross-linking the matrix and fibers by irradiating with a beam of electrons and then coating with adhesive.

The heat stable patch 6 comprises a polymeric material that may be reinforced, e.g. with glass fibers. It may comprise an inner coating of adhesive or it may comprise a suitable material which fuses to the wrapped cover on heating. An especially preferred patch 6 is described in EP-A-85303716 the disclosure of which is incorporated by reference.

For installation the cover 4 is wrapped around the object, the patch positioned, and then the whole heated,—first in the patch region to bond the patch to the cover 4 to form the closure, and then around the body of the cover to effect shrinkage. As the recoverable fibers in the warp or the fabric 8 (around the circumference) shrink, the end-to-end glass length tends to increase, caused by eliminating the undulations in the glass where the glass passed over and under the shrinkable fibers. This increase is counterbalanced by shrinkage of the recoverable fibers in the weft. Thus there is no overall increase in the fabric length, and hence no wrinkling at the join between the patch and the cover. Thus the behavior of the sleeve in its longitudinal direction corresponds to the behavior of the patch.

The overall shrinkage ratio is 25%. This is sufficiently low that the underlapped portion 14 of the wrapped cover 4 (see FIG. 1) does not increase unduly in thickness, and therefore does not impair the bond.

The overall shrinkage force is less than 15N/25 mm. This is not sufficient to cause shear between the patch 6 and the wrapped cover 4.

Figure 3:
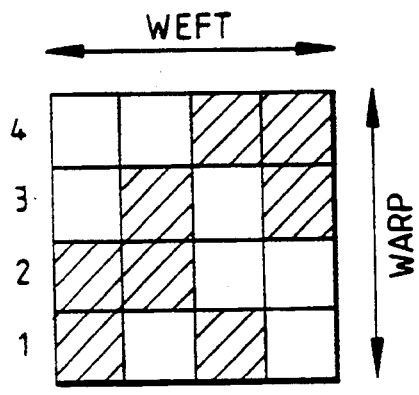
FIGS. 3 and 4 are schematic views showing the fabric design used in the cover of FIGS. 1 and 2.
Figure 4:
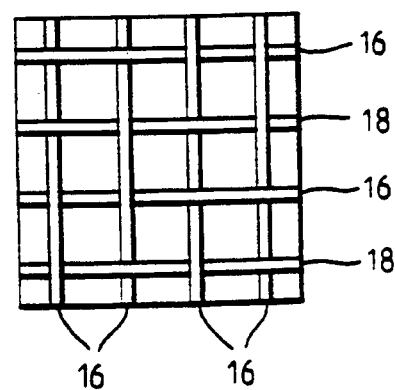

The fabric design is illustrated in FIGS. 3 and 4. FIG. 3 is a block diagram as used in the fabrication industry. The 4 by 4 square block illustrates the subsequent passage of 4 adjacent fibers in each of the warp and the weft. In the diagram the weft extends horizontally, and the warp vertically. A white square illustrates a fiber passing over the fiber in the other direction, and a hatched square a fiber passing under the fiber in the opposite direction. This is also illustrated in the more literal diagram FIG. 4 in which the heat recoverable polyethylene fibers are referenced 16 and each pair of non recoverable glass fibers is referenced 18. In the weft there is one recoverable polyethylene fiber for each pair of glass fiber bundles. Thus each of rows 1 and 3 of the weft represents passage of a single polyethylene fiber, and each of rows 2 and 4 of the weft represent passage of a pair of glass fiber bundles. Each row of the warp (represented by vertical columns in FIG. 3) represents a single polyethylene fiber. It will be seen that in the weft, each glass fiber (rows 2 and 4) has a float of 2, that is it passes alternately under and over two warp fibers. Each polyethylene fiber in the weft however (rows 1 and 3) has a float of 1, passing alternatively under and over a single warp fiber.

The float of 2 for the glass fibers reduces the amount of extension of the overall length of the weft caused by uncrimping of the glass fibers on recovery, compared to a similar design in which The glass fibers have only a float of 1 in the weft. All the polyethylene fibers in the warp have a float of 2.

The following example is given to illustrate a wraparound built from preferred materials.

EXAMPLE

The following HDPE monofilament was chosen to provide the recoverable component,

| | |
|---|---|
| Mn | 24500 |
| Mw | 135760 |
| Mz | 459000 |
| Mp | 64400 |
| D | 5.378 |
| Initial modulus (MPa) | 3881.3 |
| Tensile Strength (MPa) | 534.4 |
| Elongation (21° C.) | 21 |
| Monofilament dia (MM) | 0.38 |

This fiber had the following properties:

| | Fiber Properties Radiation Dosage (Mrads) | | | |
|---|---|---|---|---|
| Property | 0 | 8 | 16 | 32 |
| 100% Modulus (MPa) | | 0.13 | 0.3 | 0.42 |
| Tensile strength (MPa) | | 0.93 | 1.4 | 1.46 |
| Elongation to Break (%) | | 1480 | 924 | 754 |
| Gel Content (%) | | 27.0 | 58.0 | 67.0 |
| Recovery Force (MPa) | | 1.17 | 1.2 | 1.3 |
| Recovery (%) | | 89 | 88.5 | 88.5 |

The HDPE fibers were woven with non-recoverable glass fibers to produce the fabric design illustrated in FIG. 3. The recoverable HDPE fibers were the only fibers in the warp. Recoverable HDPE fibers and glass were in the weft.

The glass fibers are preferably ones having the designation EC 9 34 tex×2S152. This type of designation is standard and will be understood by those in the art. Briefly it has the following meaning EC refers to the tex value of the bundles of filaments, ×2S refers to the number of monofilaments in the bundle, 152 refers to 152 twists in the bundles per meter.

The warp density was 10 ends/cm, and the weft density was about 6 per cm (4 glass bundles and 2 HDPE in a 2 glass bundles: 1 HDPE repeating pattern). Hence the warp was the predominant shrink direction.

The fabric was rendered substantially impervious by laminating to it a low density polyethylene at a thickness of 0.5 mm on one side and 1 mm on the other side. Lamination was carried out at such a temperature, pressure and processing speed that the material permeated the interstices of the fabric but no recovery occurred.

The resulting composite was subjected to an irradiation step with 16 MeV electrons in air at room temperature for times sufficient to produce the required recovery and product functionally.

The resulting composite material had a recovery of 25%.

The composite material was used to produce a wraparound sleeve suitable for use for covering a pipe in conjunction with a closure patch.

The sleeve was arranged with the predominant shrink direction around the circumference.

The composite material was coated with a hot-melt adhesive on that side which would be inwardly facing when the sleeve was in the wrapped around configuration. The adhesive used was applied to a thickness of 1.2 mm.

We claim:

1. A recoverable wraparound article having a recovery ratio of 15 to less than 40%, and comprising
   (a) a fabric having 7 to 13 heat recoverable fibers per cm in one direction which is the predominant recovery direction and 4 to 8 fibers, at least one of which are heat recoverable and some of which are heat stable, in a substantially perpendicular direction, and
   (b) polymeric material laminated to at least one side of the fabric wherein said fabric comprises less than 0.5 times as many heat recoverable fibers in said perpendicular direction as in said predominant recovery direction.

2. An article according to claim 1, comprising 2 to 6 heat stable fibers per cm and 1 to 3 heat recoverable fibers per cm in the said perpendicular direction.

3. An article according to claim 1, wherein the heat recoverable fibers comprise high density polyethylene.

4. An article according to claim 1, wherein the heat stable fibers comprise glass.

5. An article according to claim 1, having a recovery force less than 25N per 25 mm.

6. An article according to claim 1, which shows substantially no change in its length on recovery.

7. An article according to claim 4 wherein each heat stable fiber comprises a glass fiber bundle.

8. An article according to claim 4 having a recovery force less than 25N per 25 mm.

9. An assembly comprising
   (a) a recoverable wraparound article having a recovery ration of 15 to less than 40% and comprising
      (1) a fabric having 7 to 13 heat recoverable fibers per cm in one direction which is the predominant recovery direction and 4 to 8 fibers, at least one of which are heat recoverable and some of which are heat stable, in a substantially perpendicular direction, and
      (2) polymeric material laminated to at least one side of the fabric, and
   (b) a heat stable closure patch
wherein opposed longitudinal edges of the article can be overlapped and a patch secured over the lapped region to close the article wherein said fabric comprises less than 0.5 times as many heat recoverable fibers in said perpendicular direction as in said predominant recovery direction.

10. An assembly according to claim 9 wherein there is no relative longitudinal movement of the patch and the article in the closure region on recovery.

11. An assembly according to claim 9 wherein the article comprises 2 to 6 heat stable fibers per cm and 1 to 3 heat recoverable fibers per cm in the said perpendicular direction.

12. An assembly according to claim 9 wherein the heat recoverable fibers comprise high density polyethylene.

13. An assembly according to claim 9 wherein the heat stable fibers comprise glass.

14. An assembly according to claim 9 wherein the article has a recovery force less than 25N per 25 mm.

15. An assembly according to claim 9 wherein the article shows substantially no change in its length on recovery.

* * * * *